United States Patent [19]

Tanaka

[11] Patent Number: 4,881,752
[45] Date of Patent: Nov. 21, 1989

[54] INDEPENDENT REAR WHEEL SUSPENSION SYSTEM

[75] Inventor: Hiromasa Tanaka, Saitama, Japan

[73] Assignee: Honda Giken Kogyo Kabushiki Kaisha, Tokyo, Japan

[21] Appl. No.: 227,271

[22] Filed: Aug. 2, 1988

[30] Foreign Application Priority Data

Aug. 3, 1987 [JP] Japan ................................ 62-194209
Aug. 3, 1987 [JP] Japan ................................ 62-194211
Aug. 3, 1987 [JP] Japan ................................ 62-194212
Aug. 3, 1987 [JP] Japan ................................ 62-194210
Sep. 4, 1987 [JP] Japan .......................... 62-135275[U]

[51] Int. Cl.[4] .............................................. B60G 3/00
[52] U.S. Cl. .................................... 280/690; 280/675
[58] Field of Search ............... 280/690, 691, 701, 771, 280/675

[56] References Cited

U.S. PATENT DOCUMENTS

| 4,681,342 | 7/1987 | Goerich | 280/690 |
| 4,706,989 | 11/1987 | Iijima et al. | 280/701 |
| 4,715,614 | 12/1987 | Kijima et al. | 280/690 |
| 4,738,458 | 4/1988 | Warner | 280/690 |

FOREIGN PATENT DOCUMENTS 2137757 5/1981 Fed. Rep. of Germany .

60-53408 3/1985 Japan .

Primary Examiner—Richard A. Bertsch
Attorney, Agent, or Firm—Armstrong, Nikaido, Marmelstein, Kubovcik & Murray

[57] ABSTRACT

A rear wheel suspension system, comprising a pair of hub carriers each for rotatably supporting a wheel, a plurality of lateral links for coupling the hub carriers to a vehicle body, and a pair of shock absorbers each consisting of a spring and a linear hydraulic damper for controlling impacts which are applied to one of the wheels. The shock absorbers are arranged laterally of the vehicle body, and are each coupled between the vehicle body and one of the hub carriers by way of a bell crank mechanism which may have a progressive property. The ends of the shock absorbers on the side of the vehicle body which oppose each other may be pivotally coupled to each other by way of a coupling structure which relatively elastically attaches the opposing ends to the vehicle body but relatively rigidly supports mutually abutting axial forces from the shock absorbers. This suspension system may be attached to the vehicle body by way of a subframe, which is in turn elastically attached to the vehicle body and provided with an open channel member for accommodating the shock absorbers therein to protect them from objects thrown from the road surface.

17 Claims, 9 Drawing Sheets

PRIOR ART

INDEPENDENT REAR WHEEL SUSPENSION SYSTEM

TECHNICAL FIELD

The present invention relates to an improvement of an independent rear wheel suspension system and in particular to a suspension system having a low profile which is suitable for compact vehicle design.

BACKGROUND OF THE INVENTION

As an independent wheel suspension system for an automobile, there is known the double wishbone suspension system in which a hub carrier rotatably supporting a wheel is coupled to the vehicle body by way of a plurality of lateral links which are arranged substantially in the manner of a parallel link mechanism with one link formed by the hub carrier and the opposite link formed by the vehicle body. In some cases, one of the lateral links is formed substantially as a trailing arm. Also is known the type of suspension system using a trailing arm and three lateral links, such as the one disclosed in Japanese patent laid open publication No. 60-53408. A suspension system of these types not only permit a favorable control of the changes in the toe displacement and the camber displacement of a wheel as the wheel undergoes a vertical displacement but also provides a positive supporting of the wheel against the longitudinal load as well as a favorable compliance control.

In these wheel suspension systems, a shock absorber which typically combines a coil spring and a hydraulic damper arranged in a coaxial or parallel relationship is used for reducing the impacts which are applied to the wheel. This shock absorber is arranged vertically in relation with the vehicle body, and, typically, is attached to the vehicle body at its upper end and to an intermediate part of one of the lateral links at its lower end.

However, a shock absorber is relative long in length so as to accommodate the full stroke of the vertical motion of the wheel, and this dictates the vertical dimension of the wheel suspension system. For instance, German Patent No. 2137757 discloses a lateral or, in other words, horizontal arrangement of a shock absorber consisting of a coil spring and a hydraulic damper along the widthwise or lateral direction of the vehicle to the end of improving the dynamic properties of the suspension system by mutually interconnecting a part of the linkage systems of the right and the left suspension system. This lateral arrangement of a shock absorber permits reduction of the height of the suspension system depending on the overall arrangement but the invention of this German patent publication is intended to improve the performance of the suspension system by interconnecting the two suspension systems with a highly complex linkage system without any particular reference to the possibility of reducing the height of the suspension system.

Normally, a shock absorber is accommodated in a wheel house in a vertical orientation and is thereby shielded from the impacts of external objects, but a laterally arranged shock absorber exposes the side surfaces of its damper and coil spring under the bottom floor panel of the vehicle body. Therefore, particularly in a front wheel drive vehicle, small stones which fly up from the front wheels could damage them. To prevent this problem, it is conceivable to provide an underguard on the undersurface of the vehicle body, but it leads to an increase in the manufacturing cost and the weight of the vehicle.

Moreover, conventional wheel suspension systems using vertically arranged shock absorbers have the disadvantage that the lateral link connected to the lower end of the shock absorber is required not only to support side forces but also the weight of the vehicle, and is accordingly required to be sufficiently massive to ensure the necessary mechanical strength.

Further, such a shock absorber is typically attached to a vehicle body by way of an elastic bush such as a rubber bush for reducing the transmission of vibrations and noises to the vehicle body. Typically, one end of the damper is also pivotally coupled to the vehicle body so as to permit the change in the angular position of the damper resulting from the vertical motion of the wheel. However, in pivotally supporting such a shock absorber, since the reaction from the weight of the vehicle acting upon the coil spring and the hydraulic damper is applied to the pivoted part, the compliance of the elastic bush which is interposed in the pivoted portion is required to be low in order to ensure a sufficient load bearing capability. This diminishes the capability of the elastic bush to isolate the vehicle body from vibrations and could impair the riding comfort of the vehicle.

Conventionally, the direction of the extending and compressing motion of the shock absorber coincided with the direction of the vertical motion of the wheel, and the load acting upon the wheel generally changed linearly with the displacement of the shock absorber. However, it is desirable to achieve a progressive property in which the reaction from the suspension system progressively increases as the wheel moves towards a full bump condition without unduly complicating the suspension structure. This permits reduction of the effective spring constant near the neutral position of the shock absorber without making the shock absorber any more prone to bottom out.

Further, as means for elastically defining a limit of the stroke of the damper, it is known to interpose a cushion member consisting of an elastic member normally called as a bump stop rubber between the outer tube end and the piston rod end of the damper so as to prevent the abrupt occurrence of a fully compressed state or a bottomed state of the damper. When the wheel moves into a full bump condition, the bump stop rubber intervenes by placing a limit to the bump stroke of the suspension system, and the spring reaction changes so suddenly that the occurrence of a severe tossing shock cannot be avoided. When this bump stop rubber has become effective, it produces the same effect as increasing the spring constant of the coil spring. Such a tossing shock should be reduced.

If a trailing arm is used in such a suspension structure, since the hub carrier is supported by a trailing arm which extends from a front part of the vehicle body, a relatively large torque acts upon the hub carrier which tends to turn the hub carrier in the direction to vary the toe angle as a result of the lateral and longitudinal forces which are applied to the wheel at its area of contact with the road surface. Therefore, it becomes necessary to increase the mechanical strength of the lateral links and to reduce the compliance of the rubber bushes, and a desirable toe control becomes difficult.

BRIEF SUMMARY OF THE INVENTION

In view of such problems of the prior art, a primary object of the present invention is to provide a rear wheel suspension system which permits reduction of the vertical dimension and the weight of the overall suspension system.

A second object of the present invention is to provide a rear wheel suspension system which can improve the riding comfort of a vehicle, permitting simplification of the structure at the same time.

A third object of the present invention is to provide a rear wheel suspension system in which its laterally arranged shock absorbers are advantageously protected without unduly complicating the vehicle body structure.

A fourth object of the present invention is to provide a rear wheel suspension system using a trailing arm and lateral links which is improved so as to reduce the torque which tends to turn the hub carrier in the direction to change the toe angle.

A fifth object of the present invention is to provide an improved rear wheel suspension system in which the change in the spring reaction when a bump stop rubber has intervened at the end of the stroke of the shock absorber is made smoother.

According to the present invention, these and other objects of the present invention can be accomplished by providing a rear wheel suspension system, comprising: a pair of hub carriers each for rotatably supporting a wheel; a plurality of lateral links for coupling the hub carriers to a vehicle body; and a pair of shock absorbers each consisting of a spring and a linear hydraulic damper for controlling impacts which are applied to one of the wheels, wherein: each of the shock absorbers is provided with a central axial line which extends laterally of the vehicle body, and is coupled to the vehicle body at its one end and to the hub carrier at its other end.

Thus, by arranging the shock absorbers laterally of the vehicle body, the vertical dimension of the suspension system can be reduced. Further, the load acting upon the lateral links, in particular the bending load, is eliminated, and the lateral links are only required to support side forces.

According to a certain aspect of the present invention, one end of each of the shock absorbers is coupled to the corresponding hub carrier by way of a bell crank mechanism. This permits an advantageous layout of the coupling links which are interposed between the shock absorber and the wheel, and the bell crank mechanism may be given with a progressive property providing a larger value of a displacement transmission ratio from the hub carrier to the vehicle body in a bump condition than in a rebound condition of the wheel or, in other words, a progressively greater reaction force as the wheel goes into into a full bump condition. This is advantageous because a bottoming of the suspension system under severe condition can be avoided without sacrificing the softness of the suspension system which is required for riding comfort under normal condition.

According to yet another aspect of the present invention, there is provided a bump stop rubber for limiting the bump stroke of each of the wheels, the bump stop rubber being provided with a spring constant which progressively increases as it is compressed. This allows a smooth transition of the reaction force before and after the intervention of the bump stop rubber and an overall, favorable progressive property of the suspension system can be obtained by combination of the progressive properties of the bell crank mechanism and the non-linear property of the bump stop rubber. In particular, the load acting between the shock absorber and the vehicle body or the subframe can be reduced.

According to yet another aspect of the present invention, one ends of the shock absorbers oppose each other and are pivotally connected to each other by way of coupling means which relatively elastically attach the opposing ends to the vehicle body and relatively rigidly support mutually abutting axial forces from the shock absorbers. Thereby, both a favorable riding comfort and load bearing capability can be obtained at the same time.

The coupling means may consist of a pair of elastic bushes which attach the opposing ends of the shock absorbers to the vehicle body and a substantially rigid coupling member which pivotally couples the opposing ends of the shock absorbers to each other. Preferably, the coupling member is provided with a pair of concave surfaces for pivotally receiving the opposing ends of the shock absorbers in abutting relationship.

Alternatively, the coupling means may be provided with a coupling member which is attached to the vehicle body by way of a rubber mount and is also pivotally coupled to the opposing ends of the shock absorbers by way of a pair of rubber bushes, respectively, which are less deformable than the rubber mount.

According to yet another aspect of the present invention, the opposing ends of the shock absorbers are attached to the vehicle body by way of a subframe which is elastically attached to the vehicle body and comprises an open channel member extending laterally of the vehicle body and having a downwardly facing open side, the shock absorbers being accommodated in the open channel member. Thus, the hydraulic damper can be protected by the subframe without making its structure any more complicated.

If the open side of the open channel member accommodating the shock absorbers is closed by a cover member, an even more effective protection of the shock absorbers can be accomplished.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
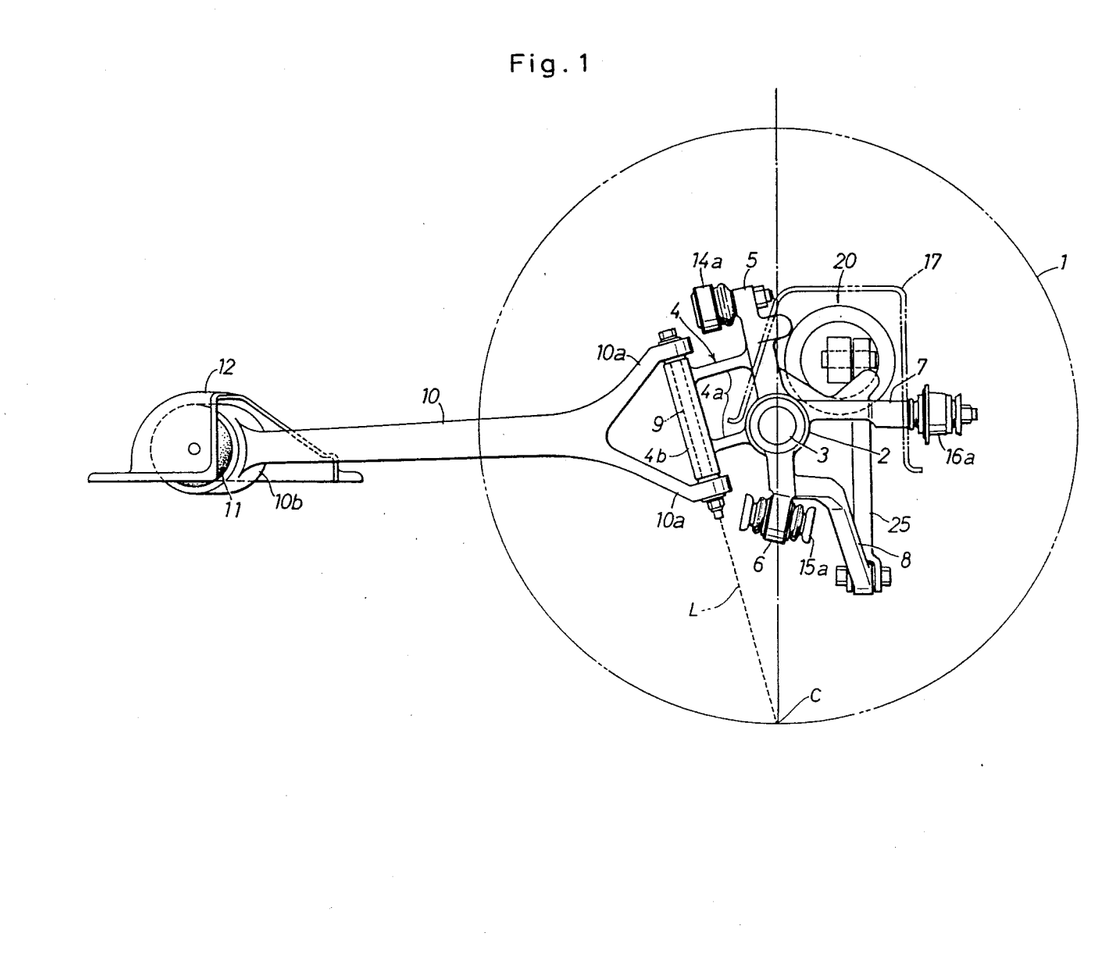
FIG. 1 is a side view of an embodiment of the wheel suspension system according to the present invention.
Figure 2:
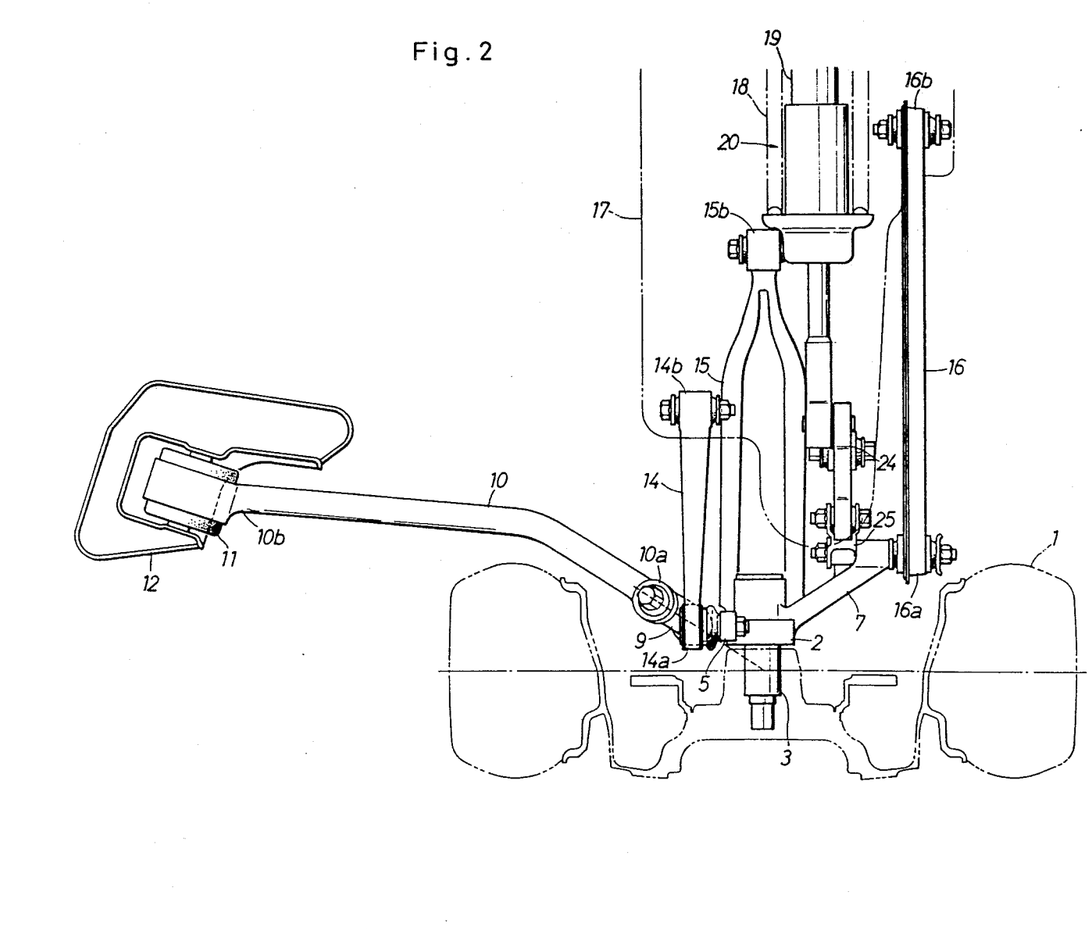
FIG. 2 is a plan view of the embodiment shown in FIG. 1.
Figure 3:
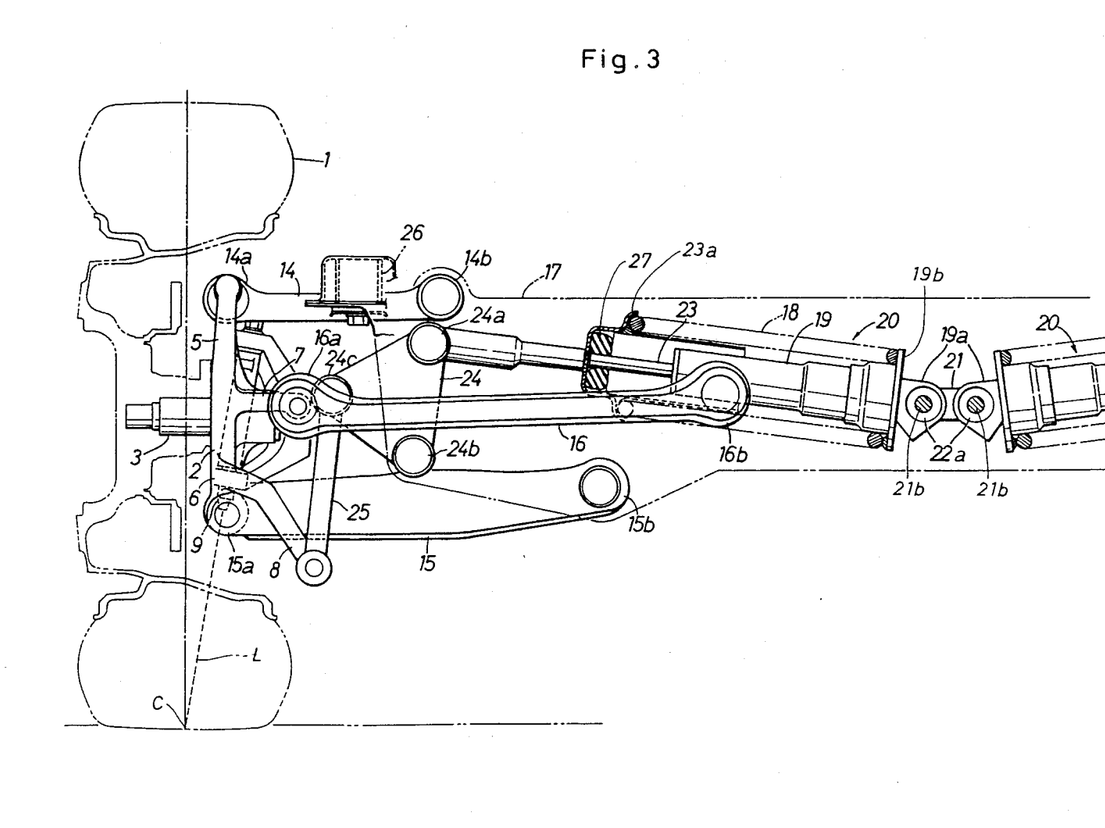
FIG. 3 is a rear view of the embodiment shown in FIG. 1.

FIGS. 1 through 3 generally show an embodiment of the rear suspension system according to the present invention. A wheel 1 is rotatably supported by a spindle 3 which is integrally formed in a hub carrier 2 so as to project laterally therefrom. The hub carrier 2 is provided with five arms 4, 5, 6, 7 and 8 which project integrally therefrom in approximately radial directions.

The first arm 4 which projects forwardly from the hub carrier 2 is provided with a pair of parallel arm members 4a and a sleeve 4b formed across the free ends of the arm members 4a perpendicularly thereto for receiving a pivot shaft 9 therein. This pivot shaft 9 has a central axial line which inclines in both the forward and inward direction. The bifurcated rear end 10a of a trailing arm 10 which extends longitudinally of the vehicle body is pivotally coupled to the sleeve 4b by way of this pivot shaft 9. This trailing arm 10 is slightly curved toward the inner part of the vehicle body for avoiding an interference with the wheel 1 as best shown in FIG. 2, and its forward end 10b is pivotally attached to a bracket 12 which is formed in the bottom surface of the vehicle body, by way of a rubber bush 11.

The second, the third and the fourth arm 5, 6 and 7, which extend upwardly, downwardly and rearwardly from the hub carrier 3, respectively, are pivotally coupled to the outer ends 14a, 15a and 16a of the first, the second and the third lateral link 14, 15 and 16, respectively. The outer ends 14a and 15a of the first and the second link 14 and 15 are substantially aligned along a vertical direction while the outer end 16a of the third link 16 is placed slightly inwardly than those of the first and the second lateral link 14 and 15. The inner ends 14b, 15b and 16b of these three lateral links 14, 15 and 16 are pivotally connected to appropriate locations of a subframe 17 of the vehicle body.

These lateral links 14, 15 and 16 extend substantially in parallel with each other when the vehicle is not yet loaded. The first lateral link 14 which is disposed higher that the other links is relatively short in length while the second lateral link 15 disposed below the first lateral link 14 and the third lateral link 16 which is disposed behind the second lateral link 15 are both relative long in length and are of a substantially same length.

The inner ends 14b, 15b and 16b of the first, the second and the third lateral link 14, 15 and 16 are pivotally connected to the subframe 17 by way of longitudinally extending pivot shafts and rubber bushes. The outer end 14a of the first lateral link 14 is connected to the second arm 5 of the hub carrier 2 by way of a ball joint while the outer end 15a of the second lateral link 15 is connected to the third arm 6 of the hub carrier 2 by way of a ball joint. The outer end 16a of the third lateral link 16 is connected to the fourth arm 7 of the hub carrier 2 by way of a pivot shaft and a rubber bush.

Thus, the wheel 1 is allowed to undergo a vertical displacement carried by the hub carrier 2 which is moveably supported by the three lateral links 14, 15 and 16 and the trailing arm 10.

A laterally central part of the subframe 17 consists of an open channel member with its open side facing downwards as best shown by imaginary lines in FIG. 1. A pair of shock absorbers 20 each comprising a coil spring 18 and a hydraulic damper 19 arranged in a coaxial relationship are accommodated in this subframe 17 in a symmetrical arrangement about the center of the vehicle body, with the axial line of each of the shock absorbers 20 being disposed along the lateral direction of the vehicle body.

Figure 7:
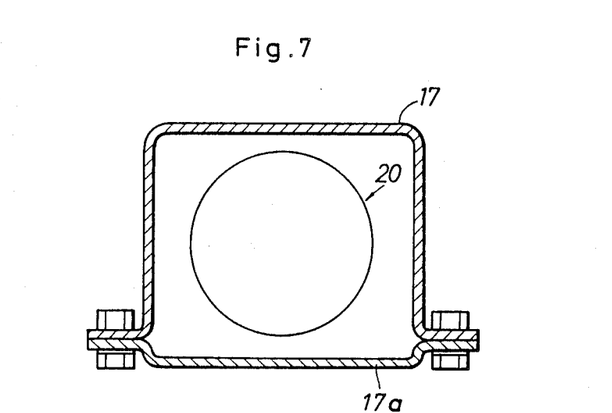
FIG. 7 is a sectional view of a part of a modified embodiment of the subframe which receives the shock absorbers therein.

In this embodiment, a central part of the subframe 17 is formed as a channel member and the shock absorbers 20 are accommodated therein. As a result, even when no protective measure is taken, the shock absorbers are well protected. If desired, the lower side of the subframe 17 may be closed with a cover 17a as shown in FIG. 7.

Figure 4:
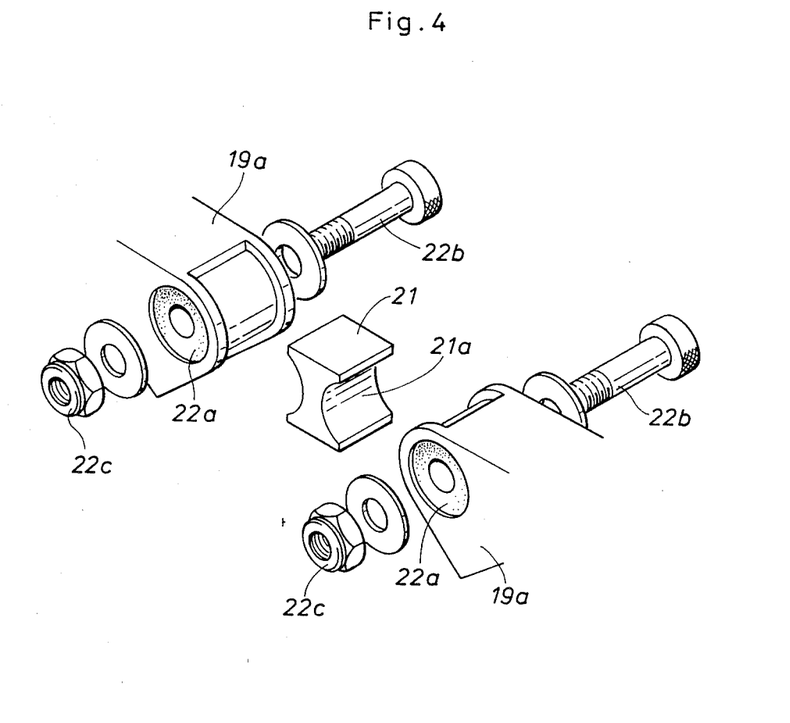
FIG. 4 is an exploded view of the coupling structure between the opposing ends of the two shock absorbers.

Each of the dampers 19 has a well known structure comprising a linear piston. The inner ends of these dampers which oppose each other in a central region of the vehicle body are each attached to the subframe 17 by way of a rubber bush 22a having a relatively high compliance and a threaded bolt 22b passed through the subframe 17 and the rubber bush 22a and fastened with nuts 22c. Further, as best shown in FIG. 4, between the opposing ends of the shock absorbers 19 is interposed a block member 21 consisting of material having a relatively low compliance such as steel and provided with a concave surface 21a on either side thereof so as to permit angular displacement of each of the dampers 20 about the block member 21 when the two pivoted parts 19a of the shock absorbers 19 abut each other by way of the block member 21.

Now, the reaction of the coil spring 18 against the weight of the vehicle directly acts upon the pivoted part 19a of the inner end of the damper. As a result, the axial load acting upon the rubber bush 22a interposed in the pivot 19a is substantial, and the compliance of the bush 22a is therefore required to be low. A low compliance of the rubber bush 22a means reduced vibration isolation capability and impaired riding comfort. However, according to the present invention, by coupling the mutually opposing inner ends of the dampers 19 by way of the block member 21 as described above, the spring forces of the coil springs 18 transmitted through the outer sleeves of the dampers 19 are canceled by each other by way of the block member 21. As a result, the inputs to the rubber bushes 22a in the pivoted portions 19a of the inner ends of the dampers 19 are effectively reduced, and the compliance of the rubber bushes 22a can be increased.

Figure 6:
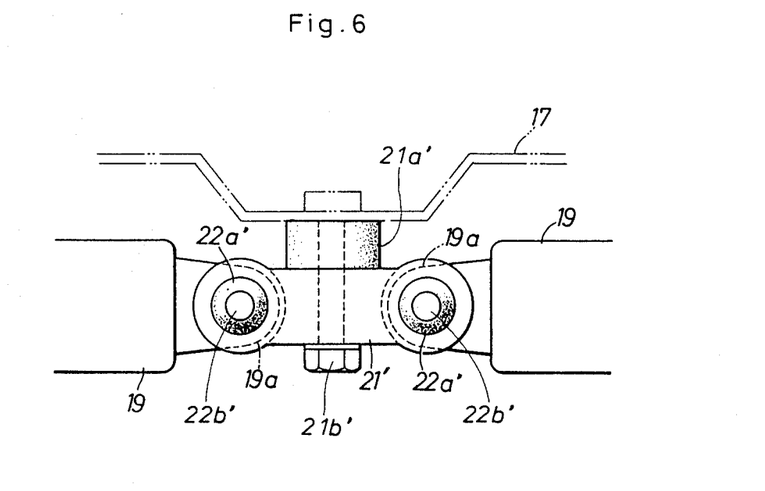
FIG. 6 is a modified embodiment of the coupling structure between the opposing ends of the two shock absorbers.

FIG. 6 shows another embodiment of structure for coupling the opposing ends of the shock absorbers 20 according to the present inventions, and the parts corresponding to those of the previous embodiments are denoted with like numerals without describing them again. In this embodiment, the block member 21' consists of a rigid member, and its two ends are each formed as a clevis coupling which incorporates therein a rubber bush 22a' having a relatively low compliance (less deformable). This coupling member 21' is attached to the subframe 17 at its middle part by way of a threaded bolt 21b' and a mount rubber 21a' having a relatively high compliance (more deformable). In this embodiment also, the symmetric loads acting upon the shock absorbers 20 are supported by the block member 21' while the subframe 17 is effectively isolated from vibrations by the mount rubber 21a'.

The coil spring 18 is compressed between a pair of spring receivers 23a and 19b which are attached to the outer end of the piston rod 23 of the damper 19 and the part of the damper 19 adjacent to the pivoted end 19a, respectively, for elastically supporting the weight of the vehicle.

The free end of the piston rod 23 of each of the dampers 19 extending sideways away from the vehicle body is pivotally connected to a first corner 24a of a triangular link member 24. A second corner 24b thereof which is located below the first corner 24a is pivotally attached to the subframe 17 while a third corner 24c thereof which is located on a wheel side of the first and the second corner 24a and 24b is coupled to the fifth arm 8 projecting rearwardly from a lower part of the hub carrier 2 which was referred to earlier, by way of a coupling rod 25.

The geometrical relationship between the three corners of the triangular link member 24 are so selected that the line connecting the first and second corners 24a and 24b extends substantially perpendicular to the axial line of the damper 19 when the vehicle is not loaded while the line connecting the second and third corners 24b and 24c inclines slightly upwards from a horizontal line as seen from the second corner 24b in a fully rebound condition.

By using the triangular link member 24 as a bell crank connecting the hub carrier 2 with the shock absorber 20, it is possible to set the stroke ratio between the wheel 1 and the shock absorber 20 to a desired value, and to realize the so-called progressive property which progressively increases the stroke of the shock absorber as the wheel rides over a road protrusion and goes into a bump condition.

The subframe 17 to which the above mentioned component parts are attached is in turn attached to a part of the vehicle body (not shown in the drawings) by way of mount rubbers 26 (although only one of them is illustrated in FIG. 3) arranged in appropriate locations. The various component members of the suspension system are attached to this subframe 17 having a relatively high rigidity. Therefore, the vehicle body which typically consists of a monocoque body structure is effectively isolated from the suspension system from by means of these mount rubbers 26.

Now the action of the above described embodiment is described in the following with reference to FIG. 5.

When the wheel 1 drops into a depression in the road or when the load acting upon the wheel 1 is reduced due to the acceleration acting upon the vehicle body, the shock absorber 20 extends. As a result, the link member 24 rotates in counter clockwise direction in FIG. 5 about the second corner 24b. This in turn causes the fifth arm 8 to be pressed downward by way of the coupling rod 25 and the wheel 1, along with the hub carrier 2, is thereby moved downwards as denoted by the distance delta R. This motion is denoted with the solid lines in FIG. 5 where the corresponding parts in neutral state are denoted with broken lines.

When the wheel 1 rides over a protrusion in the road surface or the load acting upon the wheel 1 increases due to the acceleration acting upon the vehicle body, the wheel 1, along with the hub carrier 2, is thereby moved upwards as denoted by the distance delta B and the fifth arm 8 pushes up the coupling rod 25 and the link member 24 is rotated in the opposite direction. As a result, the coil spring 18 is compressed and the piston rod 23 is pushed in. This motion is denoted by dotted lines in FIG. 5.

Thus, the vertical stroke of the wheel 1 is converted into the lateral stroke of the shock absorber 20 by way of the fifth arm 8, the coupling rod 25 and the link member 24.

In this conjunction, since the first lateral link 14 and the second lateral link 15 have different lengths, the camber angle changes as the wheel 1 moves up and down. However, since the second lateral link 14 and the third lateral link 15 have a substantially same length, the toe angle remains substantially unchanged. Further, due to the action of the trailing arm 10, the caster angle increases during a rebound condition.

Figure 11:
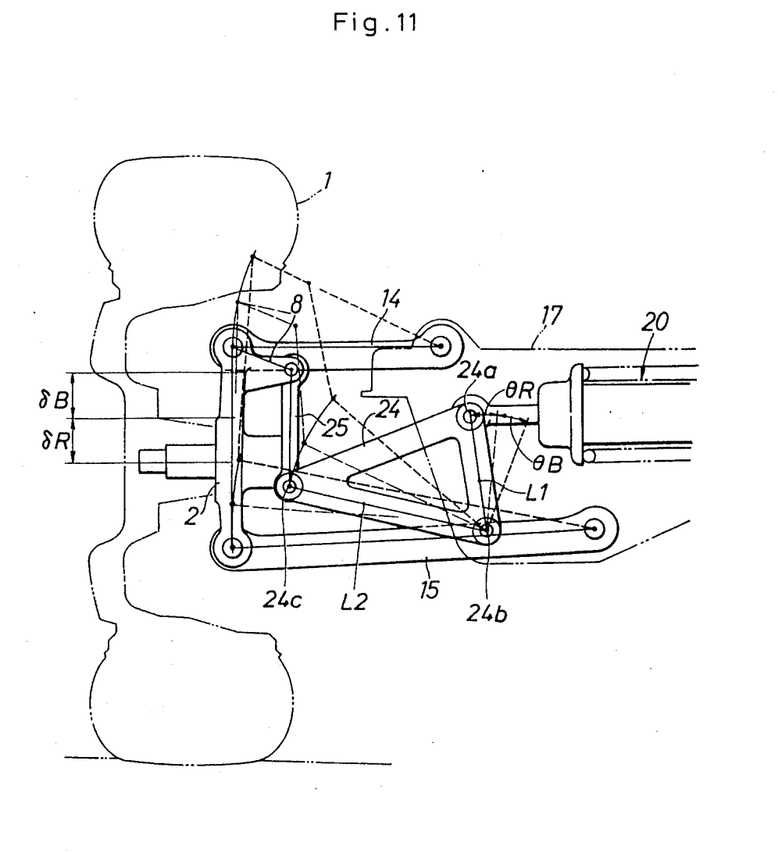
FIGS. 11 and 12 are skeleton diagrams similar to FIG. 5 showing modified embodiments, respectively.

In the above described embodiment, the coupling rod 25 pushed up the triangular link member 24 as the wheel 1 rides over a road projection, it is also possible to provide the arm 8 above the hub carrier 2 so as to pull up the coupling rod as the wheel rides over a road projection as shown in FIG. 11.

Figure 5:
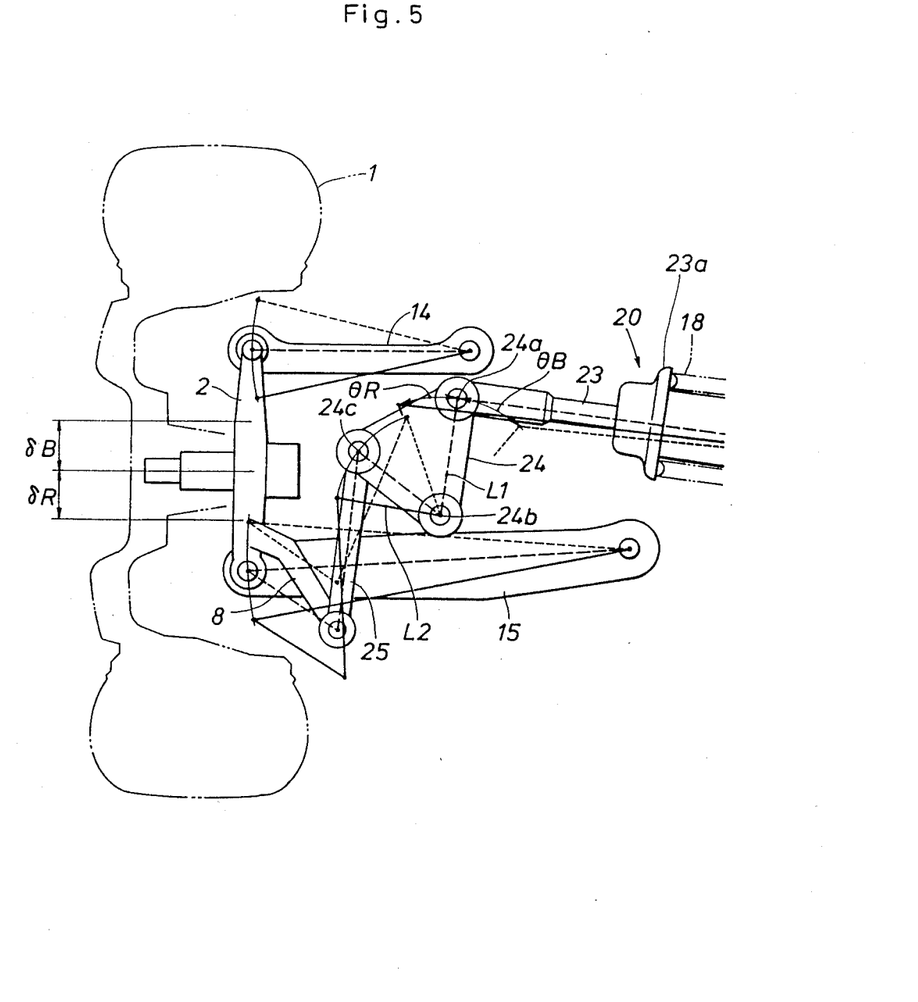
FIG. 5 is a schematic view of the embodiment for illustrating its action.

According to this wheel suspension system shown in FIGS. 1 through 3, as shown in FIG. 5, the vertical motion of the hub carrier 2 causes the third corner of 24c of the link member 24 to move along an arcuate path located immediately above a horizontal line passing through the second corner 24b which is pivotally attached to the subframe 17. The first corner 24a to which the free end of the piston rod 23 is connected travels along an arcuate path having a substantially horizontal line as its cord. If the center of the wheel 1 is displaced from its neutral position into the bump and the rebound condition by a same distance (delta B=delta R in FIG. 5), the first corner 24a undergoes a greater angular displacement in the bump direction than in the rebound condition (theta B>theta R in FIG. 5). In other words, the first corner 24a undergoes a progressive lateral displacement according to the upward displacement of the third corner 24c.

Figure 8:
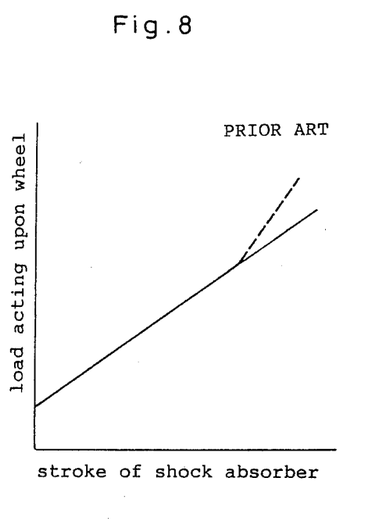
FIG. 8 is a graph showing a relationship between the wheel load and the damper stroke of a conventional suspension system.

When the wheel stroke and the spring stroke are substantially equal to each other as is the case in the strut suspension system, for instance, the relationship between the load and the displacement is substantially linear as shown in FIG. 8. On the other hand, according to the present invention, the relationship between the load and the displacement is substantially quadratic as shown in FIG. 9.

The damper 19 is provided with a bump stop rubber 27 made of rubber material at the outer end of the piston rod 23 to prevent a severe tossing shock when the damper has been fully compressed or bottomed out. When the damper 19 is fully compressed and the bump stop rubber 27 becomes effective, the reaction from the bump stop rubber 27 is added on the reaction from the coil spring 18, and it produces the same effect as if the spring constant were suddenly increased as shown by the broken lines in FIGS. 8 and 9.

Figure 9:
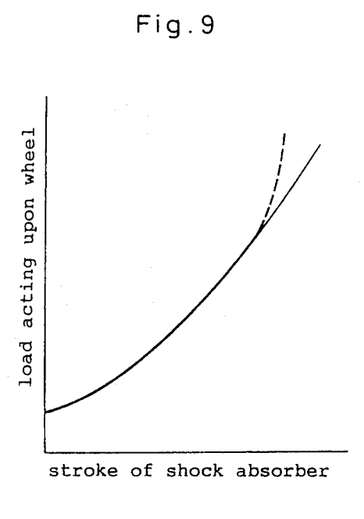
FIG. 9 is a graph similar to FIG. 8 according to the wheel suspension system of the present invention.

The intervention of the bump stop rubber 27 causes the curve to be a sharply bent line in the conventional system as shown in FIG. 8, but this transition can be made much smoother or the curve can be made into a gradually curved line according to the present invention as shown in FIG. 9, since the reaction which the shock absorber 20 produces is substantially quadratic particularly in the part of the stroke range of the shock absorber adjacent to the bump stop rubber 27.

Figure 10:
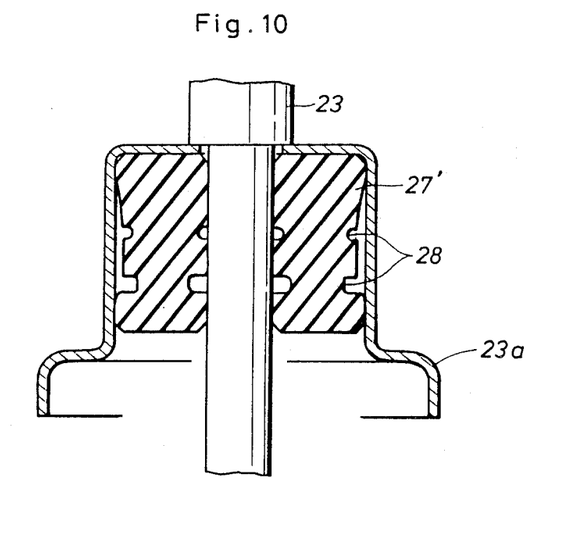
FIG. 10 is a sectional view of another embodiment of the bump stop rubber according to the present invention.

FIG. 10 shows another embodiment of the bump stop rubber according to the present invention. In this embodiment 27', a plurality of annular grooves 28 having appropriate dimensions along the axial direction and in the radial direction are provided around the outer circumferential surface of the bump stop rubber 27'. Thus, the parts of the bump stop rubber 27' having smaller cross sections start deforming earlier than other parts, and the effective spring constant of the bump stop rubber may be varied in a step-wise manner, each transition taking place upon collapsing of each of the grooves 28. Thus, according to this bump stop rubber 27' having a progressive property, the above mentioned transition is made even more smoother because the overall reaction of the shock absorber is produced as a combination of the progressive reaction due to the above mentioned geometric arrangement of the bell crank mechanism and the progressive property of the bump stop rubber 27' itself.

Figure 12:
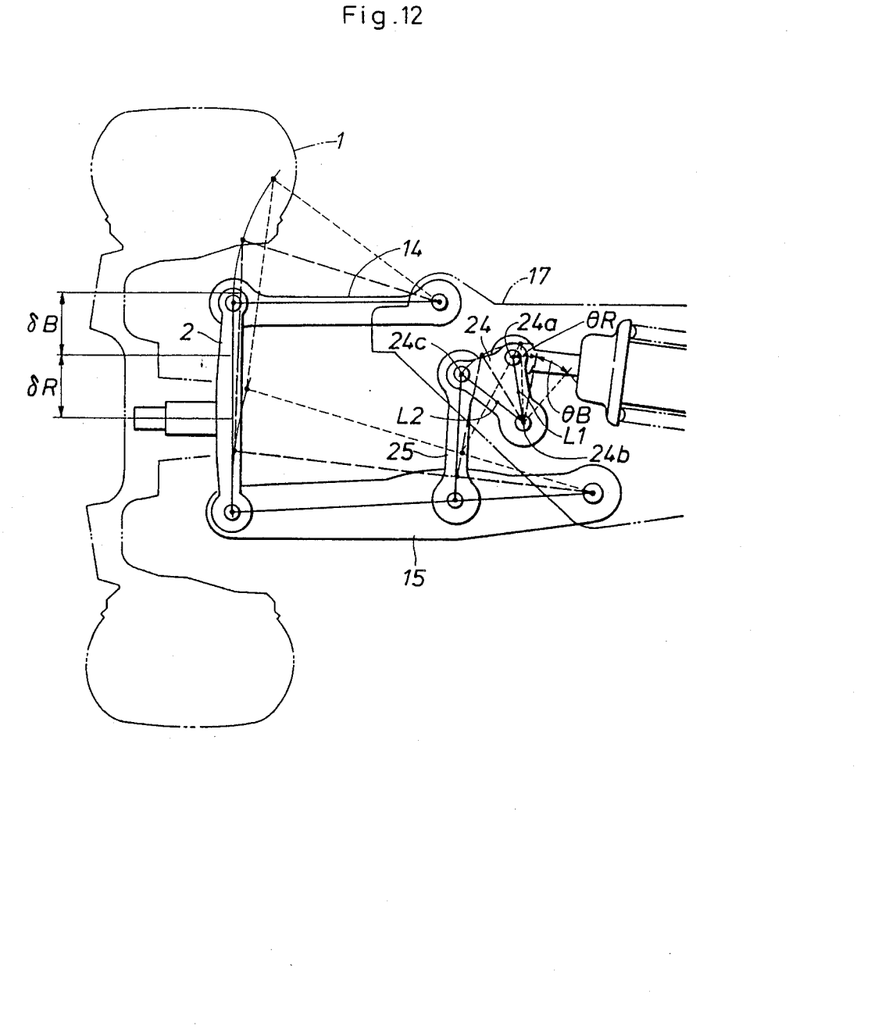

The means for giving a progressive property to the stroke of the shock absorber is not limited by the above embodiment, and a number of alternatives and modifications can be conceived. For instance, as shown in FIG. 11 which was referred to earlier, it is possible to place the fifth arm 8 above the hub carrier 2 so that the coupling rod 25 may pull up the third corner 24c, or, alternatively, as shown in FIG. 12, to couple the coupling rod 25 directly with the lower arm 15. In any case, the relationship "theta B>theta R" when "delta B=delta R" can be accomplished in the same way as in the first embodiment.

Thus, according to the present invention, by making the change in the spring reaction smooth in spite of an intervention of a bump stop rubber, the severe tossing shock at the time of a full bump condition can be reduced and the riding comfort can be improved. In particular, as shown in the above described embodiments, by giving a progressive property to the damper, the performance of the shock absorber is even more effectively improved.

Conventionally, a shock absorber used to be connected to either an upper or a lower lateral link. Therefore, the wheel load directly acted upon the lateral link, and this necessitated for the lateral link to have a sufficient bending strength to withstand this load. This not only increased the weight of the suspension system but also, because of the large load input to the lateral link, the compliance of the rubber bushes to the pivot connections of the lateral link to the vehicle body had to be lower than desired and the riding comfort was thereby impaired.

According to the present invention, this problem is eliminated by providing the input point of load to the shock absorber system at the hub carrier.

Thus, according to the present invention, no bending stress directly acts upon any of the lateral links. Therefore, the lateral links are required to withstand only the axial forces acting thereupon, and not only the weight of the wheel suspension system can be reduced but much freedom is allowed to the selection of the compliance of the rubber bushes which are interposed between the lateral links and the vehicle body. Further, by placing the shock absorbers laterally of the vehicle body, the vertical dimension thereof can be drastically reduced and a very compact design of the wheel suspension system is made possible.

The hub carrier, even when it is coupled to the vehicle body by way of a so-called parallel linkage, moves laterally as it moves vertically. Generally, a rear end of a trailing arm and a hub carrier are rigidly connected to each other. Therefore, such a displacement of a hub carrier must be accommodated by the deflection of the trailing arm or by the compliance of the rubber bushes provided in various pivot points. Therefore, in a wheel suspension system in which a trailing arm and a hub carrier are rigidly connected to each other, a lateral torque acts upon the wheel about the pivot point of the trailing arm in relation with the vehicle body, and the control of the rigidity against a toe displacement is a major problem.

Therefore, according to the present invention, the trailing arm 10 and the hub carrier 2 are connected to each other by way of the inclined pivot shaft 9 so as to be able to rotate sideways, and, further, the influence of the trailing arm 10 upon the toe displacement is eliminated by making the extension line L of the pivot shaft 9 coincide with the center of the contact area C of the wheel 1 with the road surface.

In the above described embodiments, the shock absorbers were arranged laterally, but this last mentioned concept is also applicable to other suspension systems having vertically arranged shock absorbers.

Thus, according to the present invention, since the reaction from the coil spring does not directly act upon the coupling between the shock absorber and the vehicle body, the input to the rubber bush is reduced. Therefore, it becomes possible to increase the compliance of the rubber bushes, thereby offering a substantial advantage in simplifying the structure of the shock absorber and improving the riding comfort.

Thus, according to the present invention, laterally arranged shock absorbers can be accommodated in a subframe without complicating the vehicle body structure, and not only a substantial advantage can be gained in achieving a compact design of a suspension system but also, particularly in the case of a frontwheel drive vehicle running in off-road terrain, the shock absorbers can be protected from the stones which are flown up by the front wheels and could otherwise directly impinge upon the shock absorber.

What we claim is:

1. A rear wheel suspension system, comprising:
   a pair of hub carriers each for rotatably supporting a wheel;
   a plurality of lateral links for coupling said hub carriers to a vehicle body;
   a pair of bell crank members pivotally supported by said vehicle body at first ends;
   a pair of coupling rods each pivotally connected at one end to a corresponding one of said hub carriers and at another end connected to a second end of a corresponding one of said bell crank members; and
   a pair of shock absorbers each consisting of a spring and a linear hydraulic damper for controlling impacts which are applied to one of said wheels and connected at one end to said vehicle body and to a third end of a corresponding one of said bell crank members.

2. A rear wheel suspension system as defined in claim 1, wherein said bell crank members are provided with a progressive property providing a larger value of a displacement transmission ratio from said hub carrier to said vehicle body in a bump condition than in a rebound condition of said wheel.

3. A rear wheel suspension system as defined in claim 2, further comprising a bump stop rubber for limiting the bump stroke of each of said wheels, said bump stop rubber being provided with a spring constant which progressively increases as it is compressed.

4. A rear wheel suspension system as defined in claim 1, wherein each of said bell crank members is coupled to a lower part of said hub carrier by way of said coupling rod which serves as a push rod when said wheel moves into a bump condition.

5. A rear wheel suspension system as defined in claim 1, wherein said each of said bell crank members is coupled to an upper part of said hub carrier by way of said coupling rod which serves as a pull rod when said wheel moves into a bump condition.

6. A rear wheel suspension system as defined in claim 1, wherein said one ends of said shock absorbers oppose each other and are pivotally connected to each other by way of a coupling means which relatively elastically attaches said opposing ends to said vehicle body and relatively rigidly supports mutually abutting axial forces from said shock absorbers.

7. A rear wheel suspension system as defined in claim 6, wherein said coupling means comprises a pair of elastic bushes which attach said opposing ends of said shock absorbers to said vehicle body and a substantially rigid coupling member which pivotally couples said opposing ends of said shock absorbers to each other.

8. A rear wheel suspension system as defined in claim 7, wherein said coupling member is provided with a pair of concave surfaces for pivotally receiving said opposing ends of said shock absorbers in abutting relationship.

9. A rear wheel suspension system as defined in claim 8, wherein said coupling means is provided with a coupling member which is attached to said vehicle body by way of a rubber mount and is also pivotally coupled to said opposing ends of said shock absorbers by way of a pair of rubber bushes, respectively, which are less deformable than said rubber mount.

10. A rear wheel suspension system as defined in claim 1, wherein said opposing ends of said shock absorbers are attached to said vehicle body by way of a subframe which is elastically attached to said vehicle body and comprises an open channel member extending laterally of said vehicle body and having a downwardly facing open side, said shock absorbers being accommodated in said open channel member.

11. A rear wheel suspension system as defined in claim 10, wherein said open side of said open channel member accommodating said shock absorbers is closed by a cover member.

12. A rear wheel suspension system as defined in claim 1, further comprising a pair of trailing arms each extending longitudinally of said vehicle body for coupling one of said hub carriers to said vehicle body, a rear end of each of said trailing arms being pivotally attached to said hub carrier with a pivot center line passing substantially through a center of a contact area between said wheel and a road surface.

13. A rear wheel suspension system, comprising:
a pair of hub carriers, each for rotatably supporting a wheel;
a plurality of lateral links for coupling said hub carriers to a vehicle body; and
a pair of shock absorbers each consisting of a spring and a linear hydraulic damper for controlling impacts which are applied to one of said wheels, wherein:
each of said shock absorbers is provided with a central axial line which extends laterally of said vehicle body, and is coupled to said vehicle body at one end and to said hub carrier at another end; and
said suspension system further comprises a pair of trailing arms each extending longitudinally of said vehicle body for coupling one of said hub carriers to said vehicle body; a rear end of each of said trailing arms being pivotally attached to said hub carrier with a pivot center line passing substantially through a center of the contact area between said wheel and a road surface.

14. A rear wheel suspension system, comprising:
a pair of hub carriers each for rotatably supporting a wheel;
a plurality of lateral links for coupling said hub carriers to a vehicle body; and
a pair of shock absorbers each consisting of a spring and a linear hydraulic damper for controlling impacts which are applied to one of said wheels, wherein:
each of said shock absorbers is provided with a central axial line which extends laterally of said vehicle body, and is coupled to said vehicle body at one end and to said hub carrier at another end; and
said one ends of said shock absorbers oppose each other and are pivotally connected to each other by way of a coupling means which relatively elastically attaches said opposing ends to said vehicle body and relatively rigidly supports mutually abutting axial forces from said shock absorbers.

15. A rear wheel suspension system as defined in claim 14, wherein said coupling means comprises a pair of elastic bushes which attach to said opposing ends of said shock absorbers to said vehicle body and a substantially rigid coupling member which pivotally couples said opposing ends of said shock absorbers to each other.

16. A rear wheel suspension system as defined in claim 15, wherein said coupling member is provided with a pair of concave surfaces for pivotally receiving said opposing ends of said shock absorbers in abutting relationship.

17. A rear wheel suspension system as defined in claim 16, wherein said coupling means is provided with a coupling member which is attached to said vehicle body by way of a rubber mount and is also pivotally coupled to said opposing ends of said shock absorbers by way of a pair of rubber bushes, respectively, which are less deformable than said rubber mount.

* * * * *